(12) United States Patent
Horn

(10) Patent No.: US 9,794,940 B2
(45) Date of Patent: *Oct. 17, 2017

(54) OVERLAY OF BEARERS IN A RADIO COMMUNICATION SYSTEM

(71) Applicant: TAIT LIMITED, Christchurch (NZ)

(72) Inventor: Clive Douglas Horn, Christchurch (NZ)

(73) Assignee: TAIT LIMITED, Christchurch (NZ)

( * ) Notice: Subject to any disclaimer, the term of this patent is extended or adjusted under 35 U.S.C. 154(b) by 128 days.

This patent is subject to a terminal disclaimer.

(21) Appl. No.: 14/834,609

(22) Filed: Aug. 25, 2015

(65) Prior Publication Data
US 2015/0365951 A1    Dec. 17, 2015

Related U.S. Application Data

(62) Division of application No. 13/542,147, filed on Jul. 5, 2012, now Pat. No. 9,504,034.

(60) Provisional application No. 61/504,671, filed on Jul. 5, 2011.

(51) Int. Cl.
*H04W 72/04* (2009.01)
*H04W 4/22* (2009.01)

(52) U.S. Cl.
CPC ......... *H04W 72/0453* (2013.01); *H04W 4/22* (2013.01)

(58) Field of Classification Search
CPC ...... H04W 72/04; H04W 88/08; H04W 76/00
See application file for complete search history.

(56) References Cited

U.S. PATENT DOCUMENTS

| 5,463,624 | A | * | 10/1995 | Hogg | H04L 12/403 370/461 |
|---|---|---|---|---|---|
| 5,592,470 | A | | 1/1997 | Rudrapatna et al. | |
| 5,809,021 | A | * | 9/1998 | Diaz | H04J 3/1611 370/364 |
| 6,108,552 | A | | 8/2000 | Edwards et al. | |
| 7,020,125 | B2 | | 3/2006 | Schilling | |
| 7,907,578 | B2 | | 3/2011 | Harvey et al. | |
| 8,175,550 | B2 | | 5/2012 | Woleben et al. | |
| 2007/0258417 | A1 | | 11/2007 | Harvey et al. | |
| 2009/0088092 | A1 | | 4/2009 | Wang et al. | |
| 2009/0286543 | A1 | | 11/2009 | Nath et al. | |
| 2009/0303944 | A1 | | 12/2009 | Fukuoka et al. | |
| 2010/0222007 | A1 | | 9/2010 | Rao et al. | |
| 2011/0122974 | A1 | | 5/2011 | Sundstrom et al. | |

(Continued)

FOREIGN PATENT DOCUMENTS

EP    0932318    7/1999

*Primary Examiner* — Hassan Phillips
*Assistant Examiner* — Prenell Jones
(74) *Attorney, Agent, or Firm* — Dentons US LLP; Peter Su

(57) ABSTRACT

A communication system having multiple bearers overlays a relatively narrowband bearer such as P25 on a relatively wideband bearer such as LTE, for transmission of both uplink and downlink signals. The wideband bearer uses a spectrum of subcarriers which form a set of radio frequency blocks. One or more blocks or other related parts of the spectrum may be allocated to the narrowband bearer. In some cases the narrowband bearer may push through the wideband allocation using a relatively high power to dominate signals transmitted by the wideband bearer. Voice calls such as emergency calls using the narrowband bearer may be prioritized.

22 Claims, 15 Drawing Sheets

(56) References Cited

U.S. PATENT DOCUMENTS

Figure 1A:
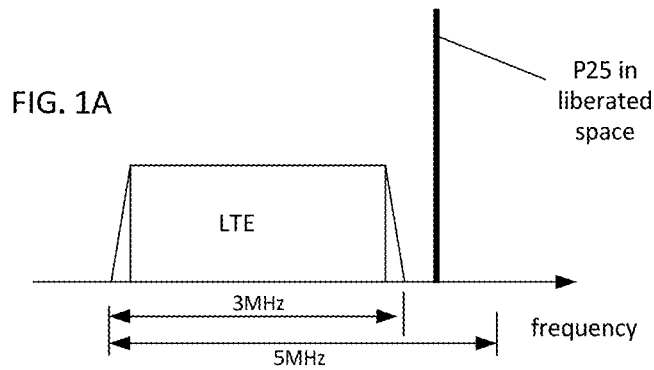

2013/0183904 A1 7/2013 Hiben et al.
2015/0057040 A1 2/2015 Kuehner

\* cited by examiner

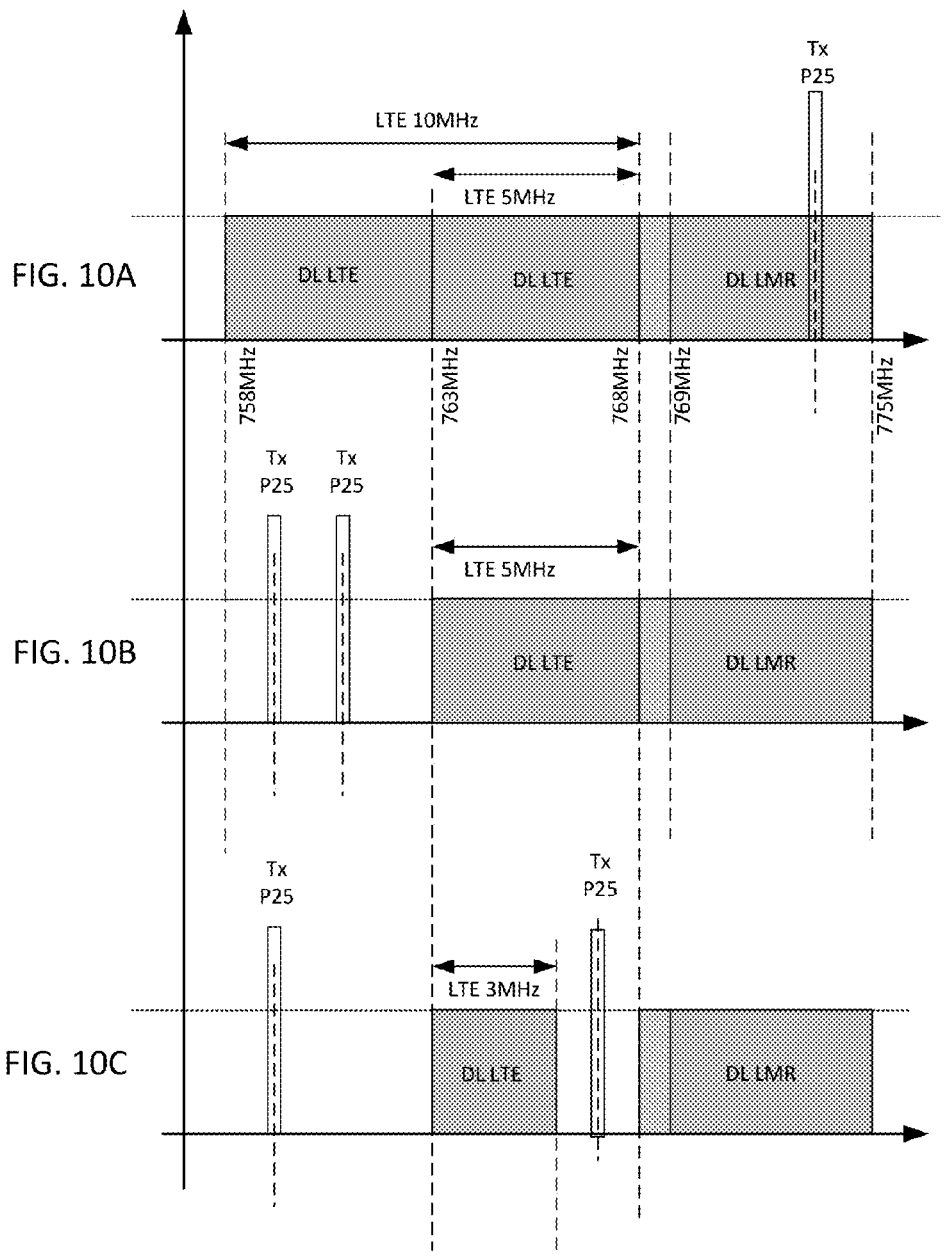

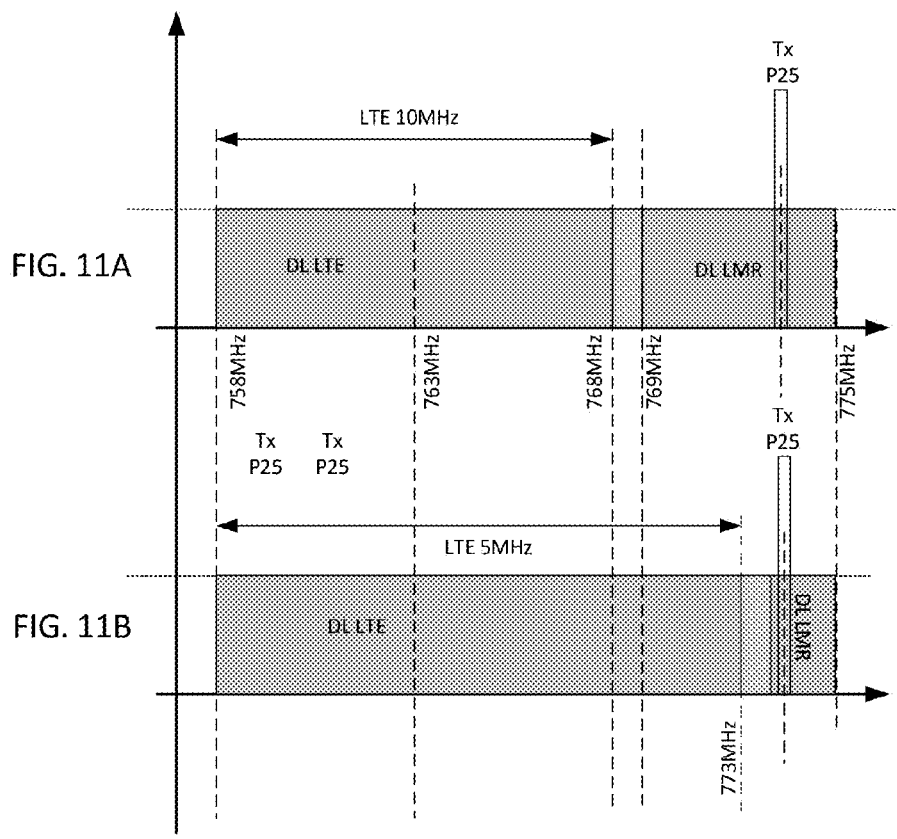
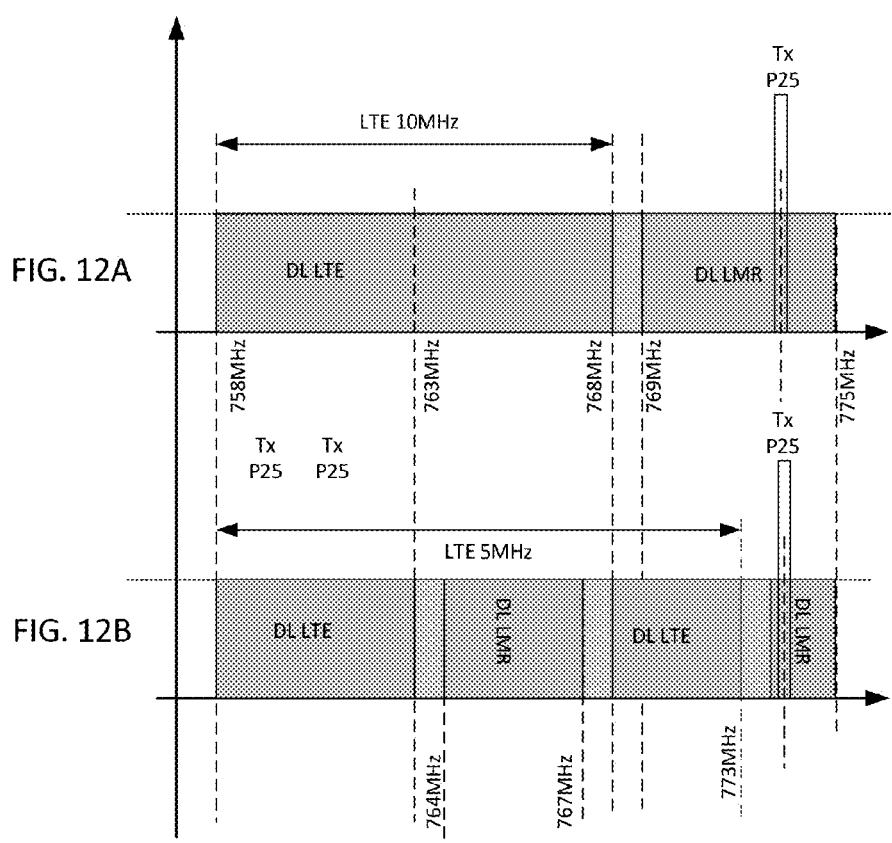

X Wanted P25 signal power
Y unwanted P25 signal power

OVERLAY OF BEARERS IN A RADIO COMMUNICATION SYSTEM

CROSS-REFERENCE TO RELATED APPLICATIONS

This application is a divisional of U.S. patent application Ser. No. 13/542,147 filed 5 Jul. 2012, which claims priority of U.S. Provisional patent application Ser. No. 61/504,671 filed 5 Jul. 2011, the disclosures of which are incorporated herein by reference in their entireties.

FIELD OF THE INVENTION

This invention relates to multi-bearer radio systems, such as systems which combine wideband and narrowband bearers. More particularly the invention relates to overlay techniques involving a relatively wideband bearer such as LTE (3GPP Long Term Evolution) and one or more relatively narrowband bearers such as P25 (APCO 25), Tetra, DMR (Digital Mobile Radio), or analogue LMR (Land Mobile Radio).

BACKGROUND TO THE INVENTION

Public safety agencies around the world are considering the deployment of broadband bearers such as LTE for improving data connectivity in their radio systems. Utility industries such as electricity distribution are also looking to exploit similar technology. The expectation is to deploy this relatively wideband technology to operate in parallel with existing narrow band systems such as P25. In the United States, the FCC has made specific frequency allocations supporting this model of deployment.

The LTE standard is based on OFDM (Orthogonal Frequency Division Multiplexing) of subcarriers and can be deployed in a number of channel bandwidths. A typical LTE FDD (Frequency Division Duplex) mode has uplink/downlink pairs including bandwidths of 20 MHz, 15 MHz, 10 MHz, 5 MHz, 3 MHz and 1.4 MHz. In the United States assignments of spectrum have been made representing 10+10 MHz in 3GPP band 14 for broadband operation. Specifically, the US has assigned frequencies 758 MHz to 768 MHz paired with 788 MHz to 798 MHz for broadband operation using LTE for Public Safety use. In addition, an assignment has been made for Public Safety for narrow band operation from 769 MHz to 775 MHz paired with 799 to 805 MHz. In other parts of the world private broadband assignments are being considered for use by public safety and critical infrastructure.

LTE coverage is made up of a number of frequency blocks, also referred to as resource blocks. An FDD 5 MHz channel has a set 25 resource blocks where each block is 180 kHz. Collectively the set of 25 blocks produces a bandwidth of 4.5 MHz within the 5 MHz channel with the 0.5 MHz remainder being used to contain the spectral skirts that operate within regulated emission masks. The channel is further divided into timeslots each of 0.5 ms, where a collection of 20 slots defines a frame. A resource block is therefore a block extending over a period which may include many timeslots. A set of frequency blocks contains many frames.

Each bearer in a wireless communication system requires a network of base stations to provide the channels over which users can communicate. The base stations are geographically located to provide coverage over a wide area within which the users are expected to move and require voice or data services. The users typically employ hand held or vehicle mounted terminals to communicate with the base stations. Each network generally includes a scheduler or controller which determines the timing and pathway of calls through the network. Bearer networks send control messages which are interpreted by the user terminals, in addition to voice and data messages which are sent between the users. In a trunked radio system a relatively large number of users share a relatively small number of frequencies, without being assigned to a fixed frequency for the duration of each call.

SUMMARY OF THE INVENTION

It is an object of the invention to provide for improved use of available frequency spectrum in a multi-bearer radio system involving LTE and P25.

In one aspect the invention resides in a method of transmitting multiple radio bearer signals, including: providing a set of radio frequency blocks, allocating one or more frequency blocks for transmission of one or more signals using a first bearer, allocating one or more frequency blocks for transmission of one or more signals using a second bearer, and transmitting the signals using their allocated frequency blocks.

Preferably the first bearer provides a relatively wideband service for which multiple frequency blocks are allocated, while the second bearer provides a relatively narrowband service for which a single frequency block is allocated. The frequency blocks allocated to the first bearer are generally grouped together, but may be separated by one or more blocks allocated to the second bearer. Frequency blocks allocated to the second bearer may lie at one end of the set of blocks. When either bearer ceases transmission in some or all of an allocated portion of spectrum then the allocation available to the other bearer is generally increased. The signals transmitted using either bearer generally include both uplink signals transmitted by user terminals and downlink signals transmitted by base stations.

In another aspect the invention resides in a method of providing radio services using multiple bearer signals, including: providing a set of radio frequency blocks, allocating the frequency blocks for services using a first bearer, receiving a request for services using a second bearer, and re-allocating one or more of the frequency blocks for services using the second bearer. Signals such as voice calls and particularly emergency calls may therefore be prioritised.

In a further aspect the invention resides in a controller for a radio network, having a processor and memory, the memory containing instructions which cause the controller to carry out a method as outlined above.

In a further aspect the invention resides in a controller for terminal unit for a radio network, having a processor and memory, the memory containing instructions which cause the controller to select a bearer from multiple available bearers for transmission and reception of signals as outline above.

LIST OF FIGURES

Figure 1B:
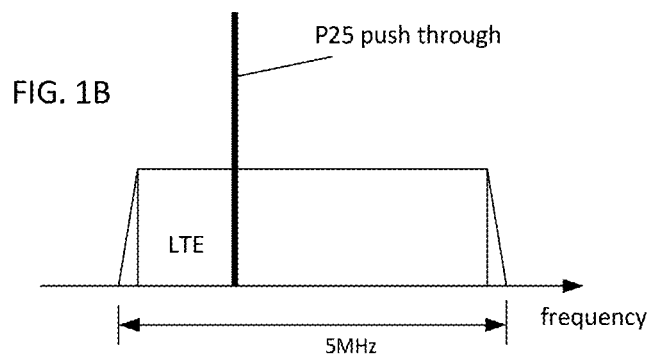
Figure 1C:
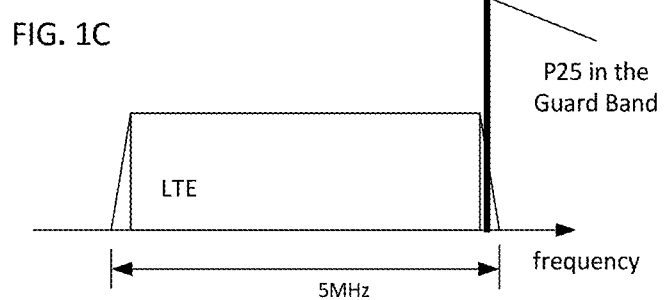
Figure 1D:
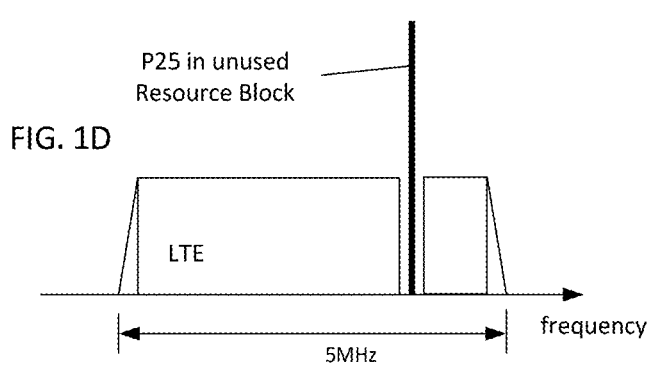
Figure 2:
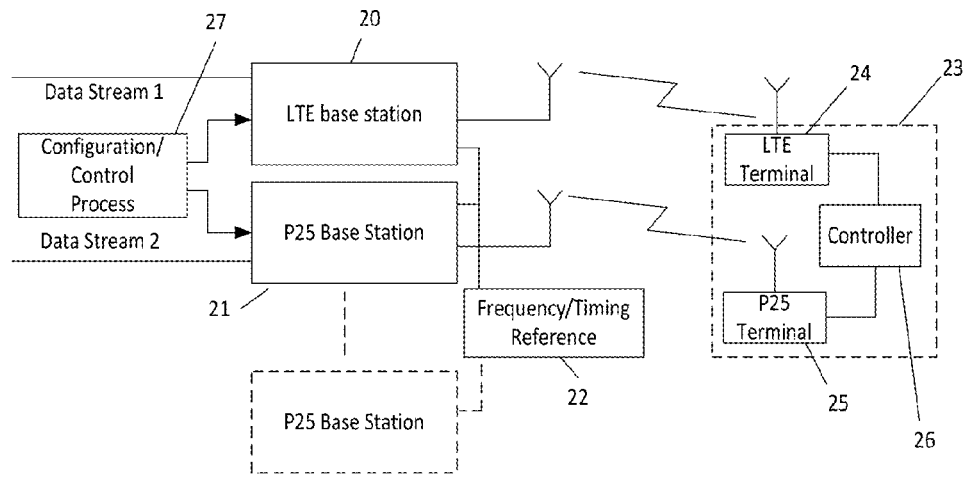
Figure 3:
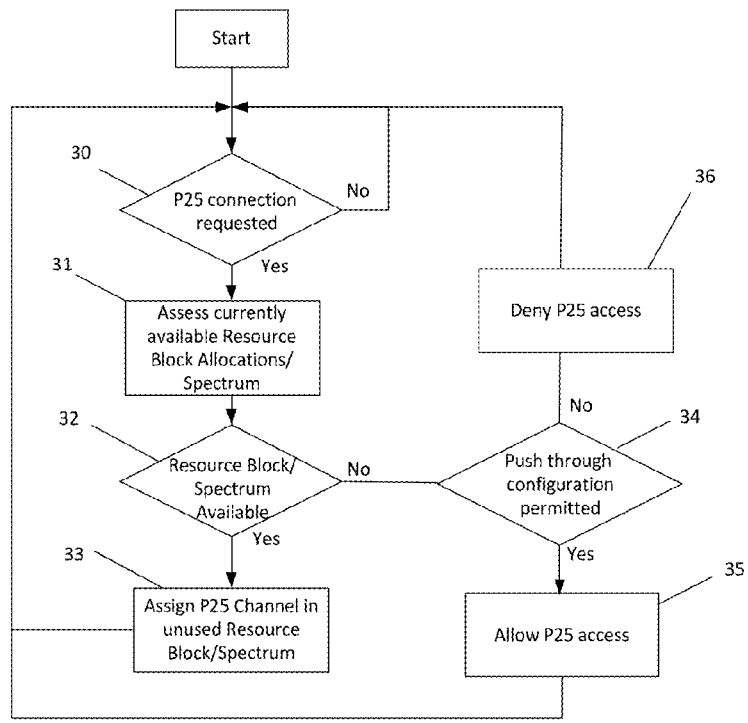
Figure 4:
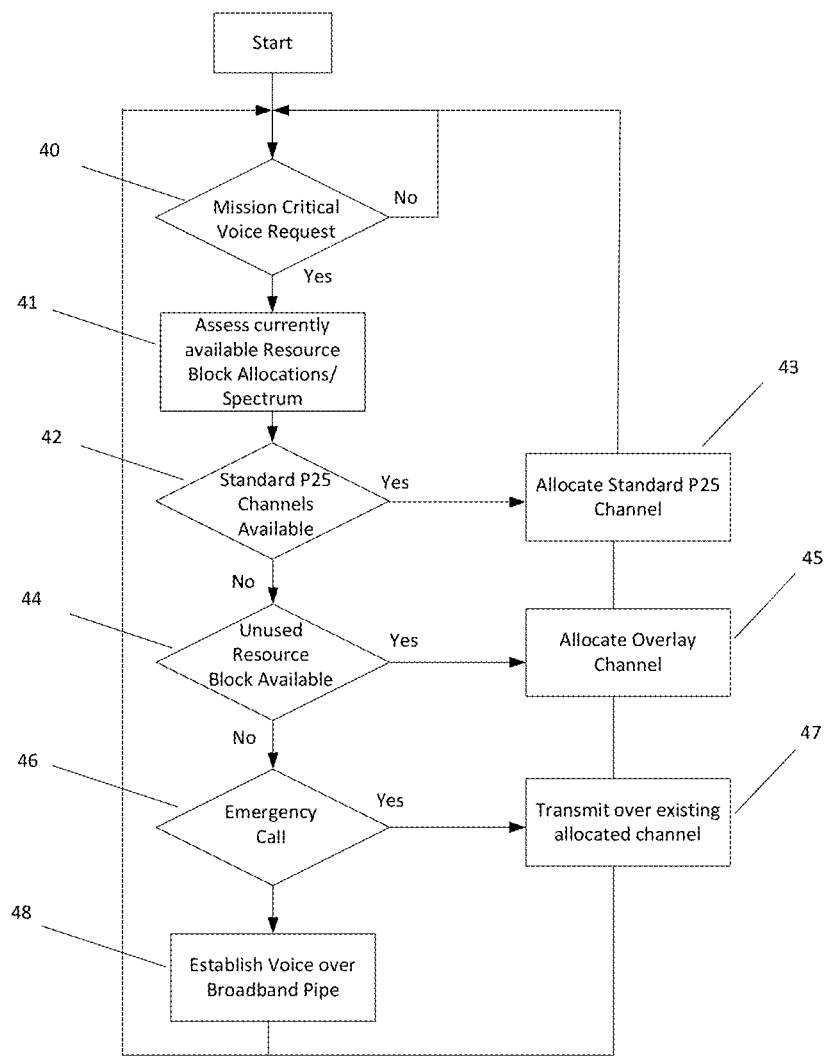
Figure 5:
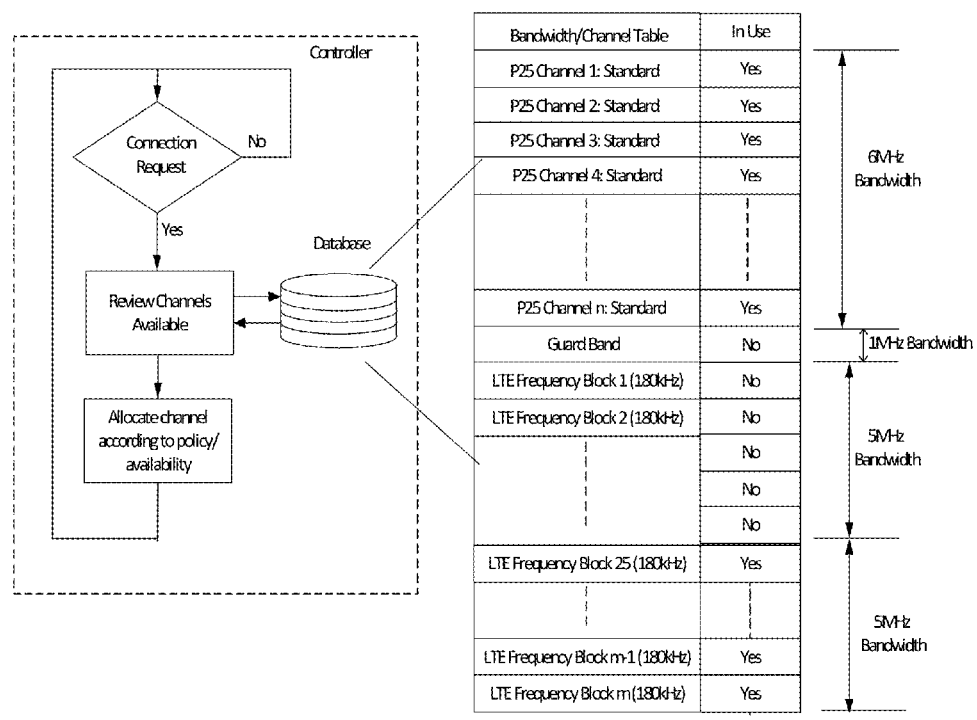
Figure 6:
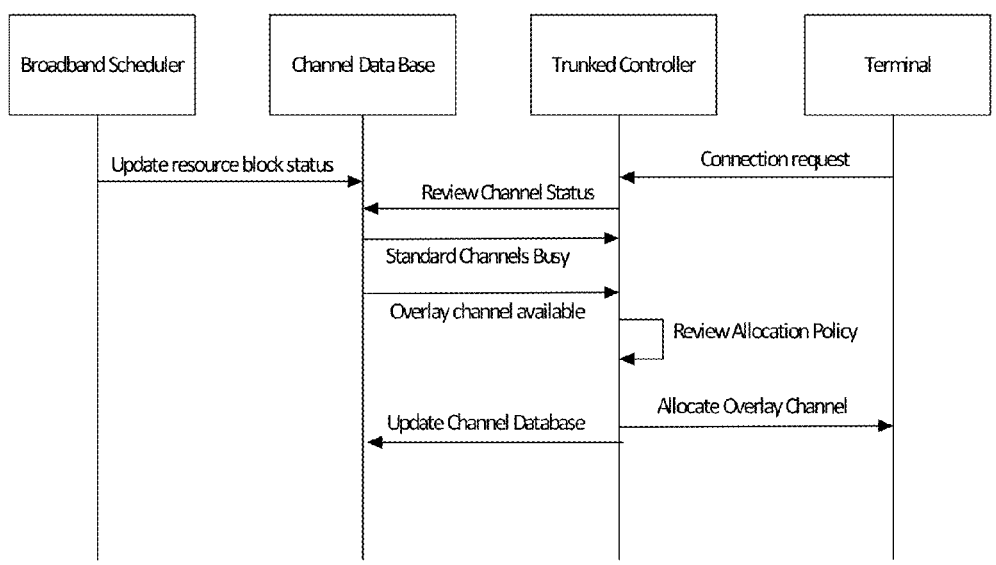
Figure 7:
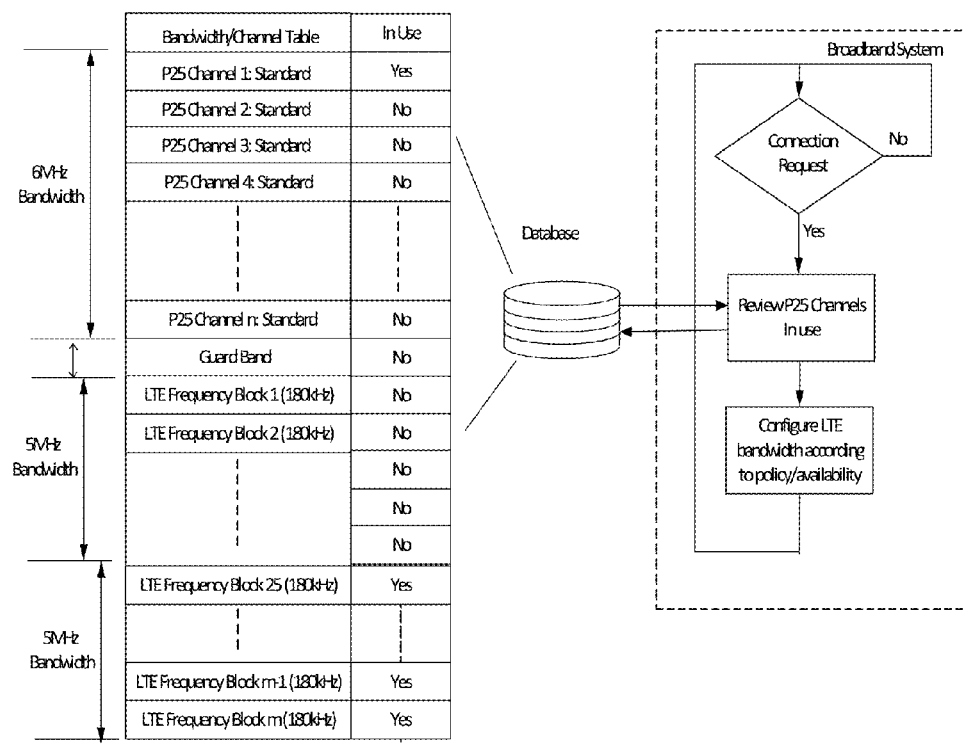
Figure 8:
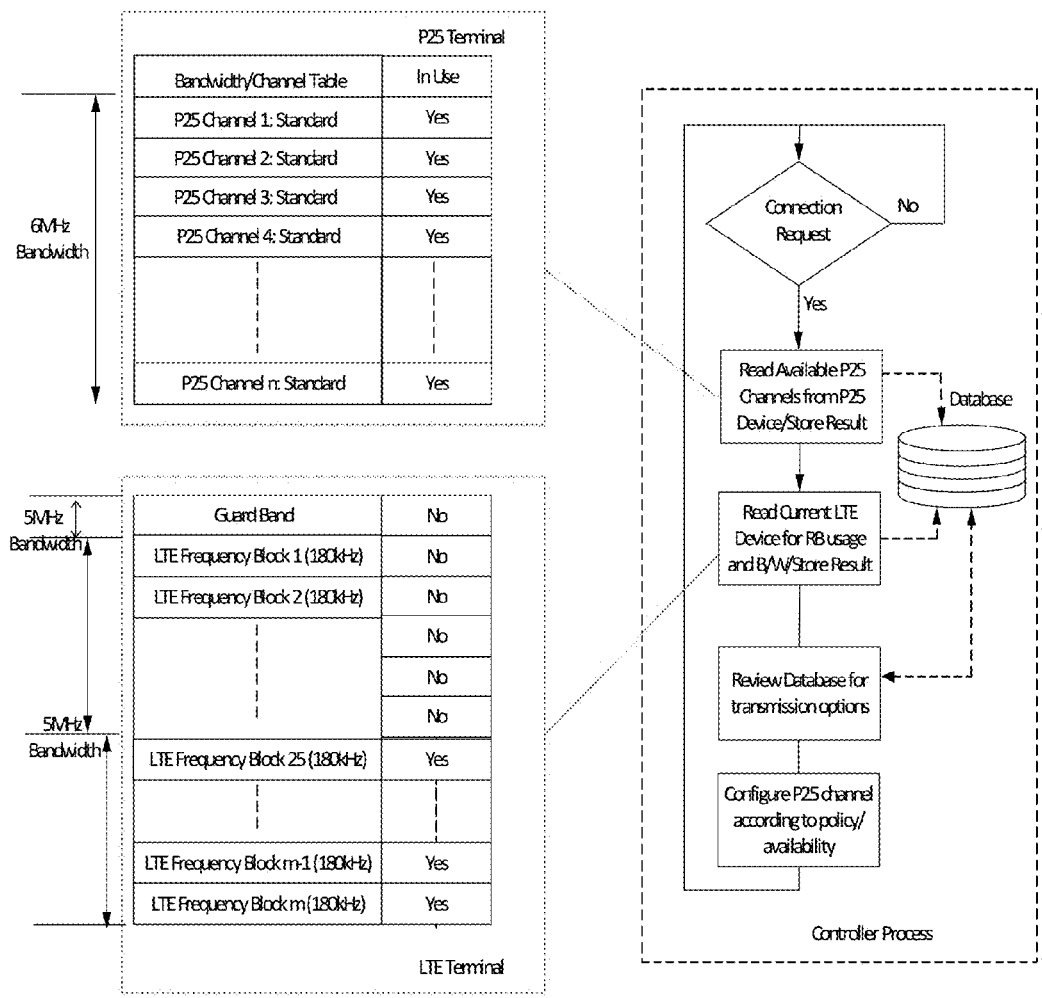
Figure 9A:
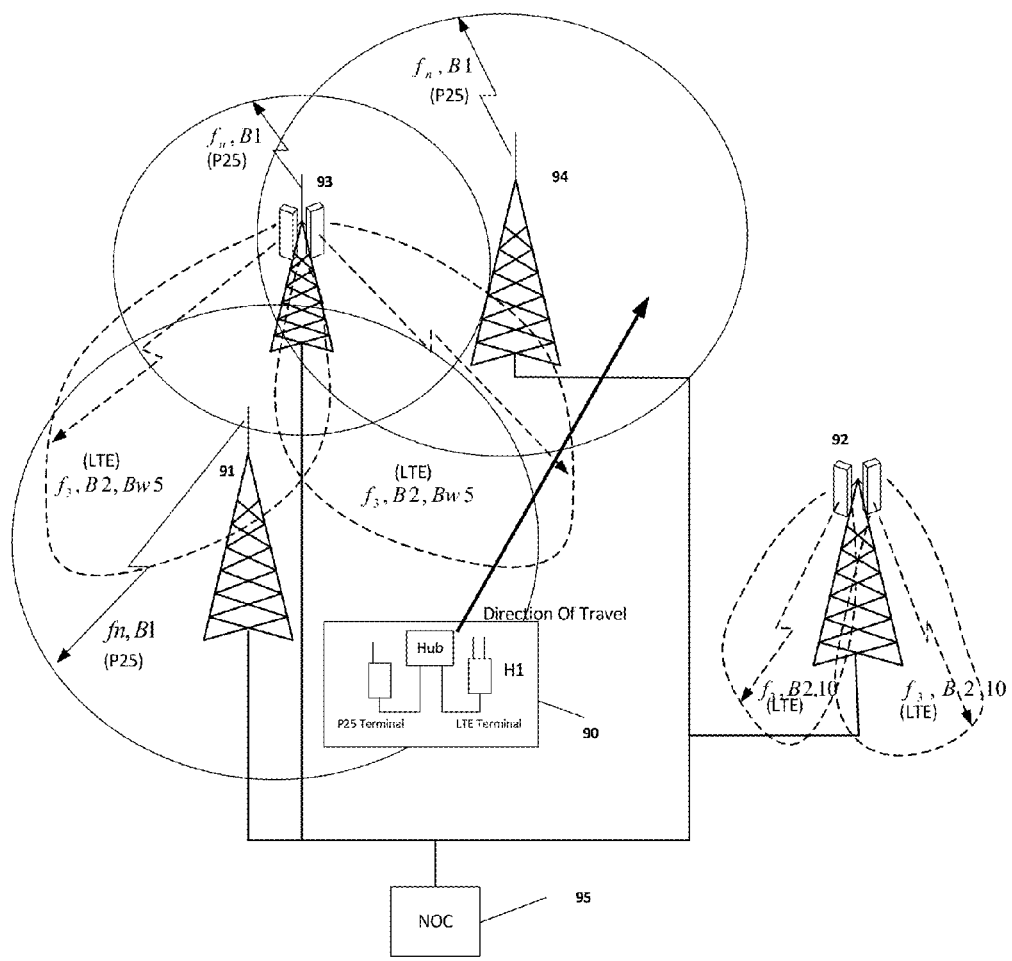
Figure 9B:
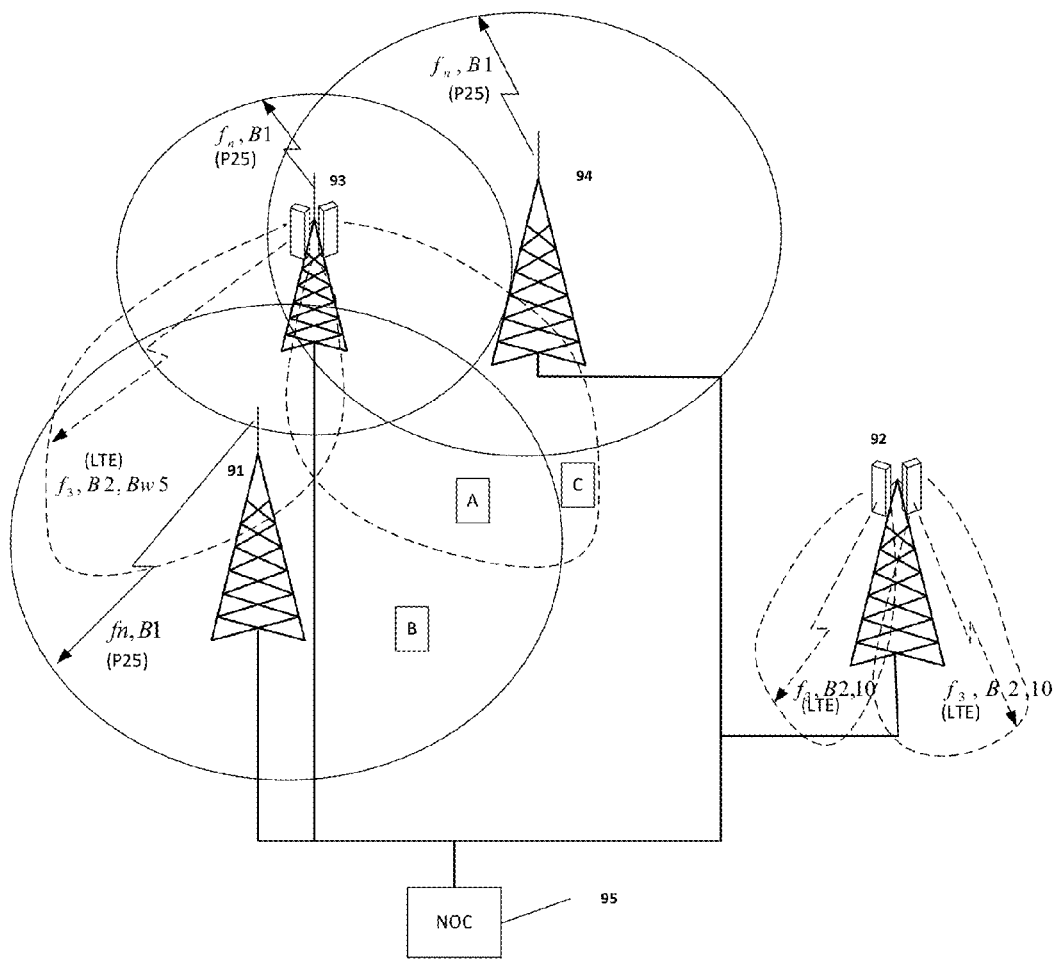
Figure 13:
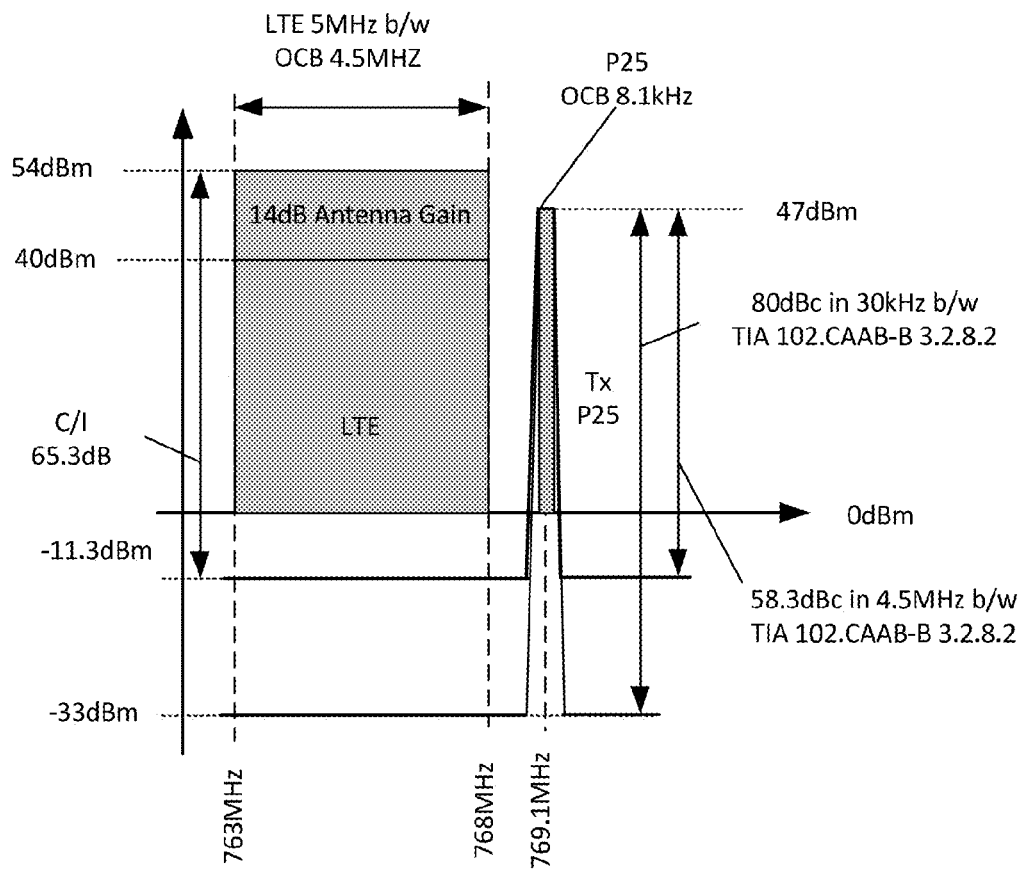
Figure 14:
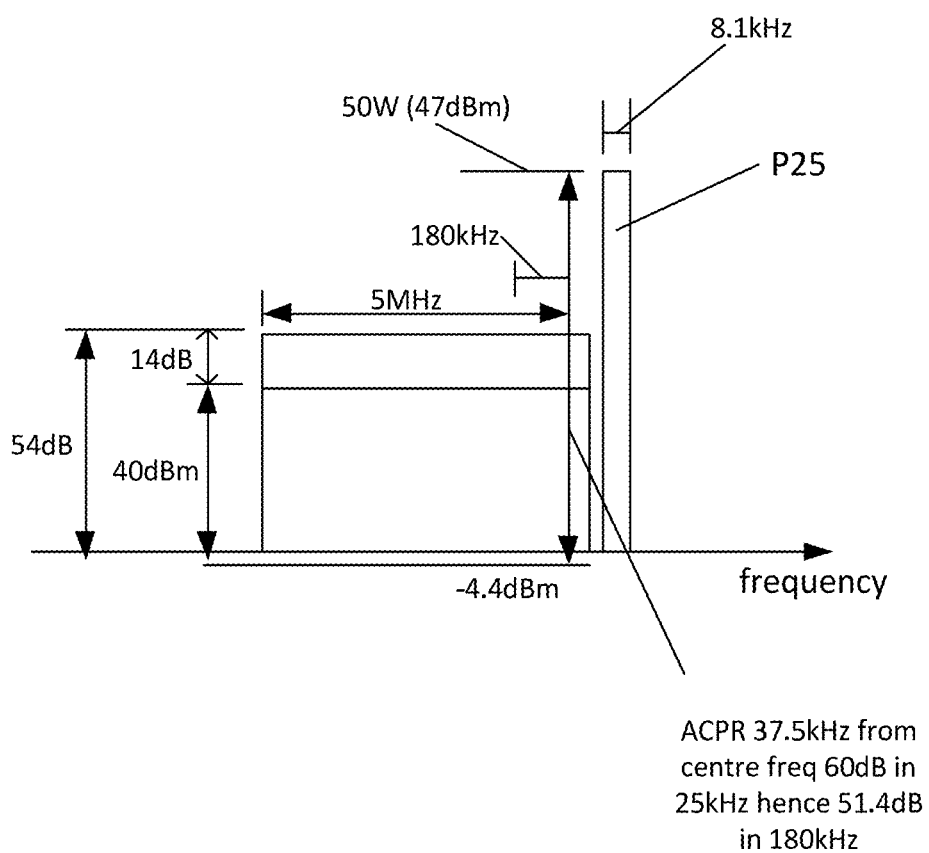
Figure 15:
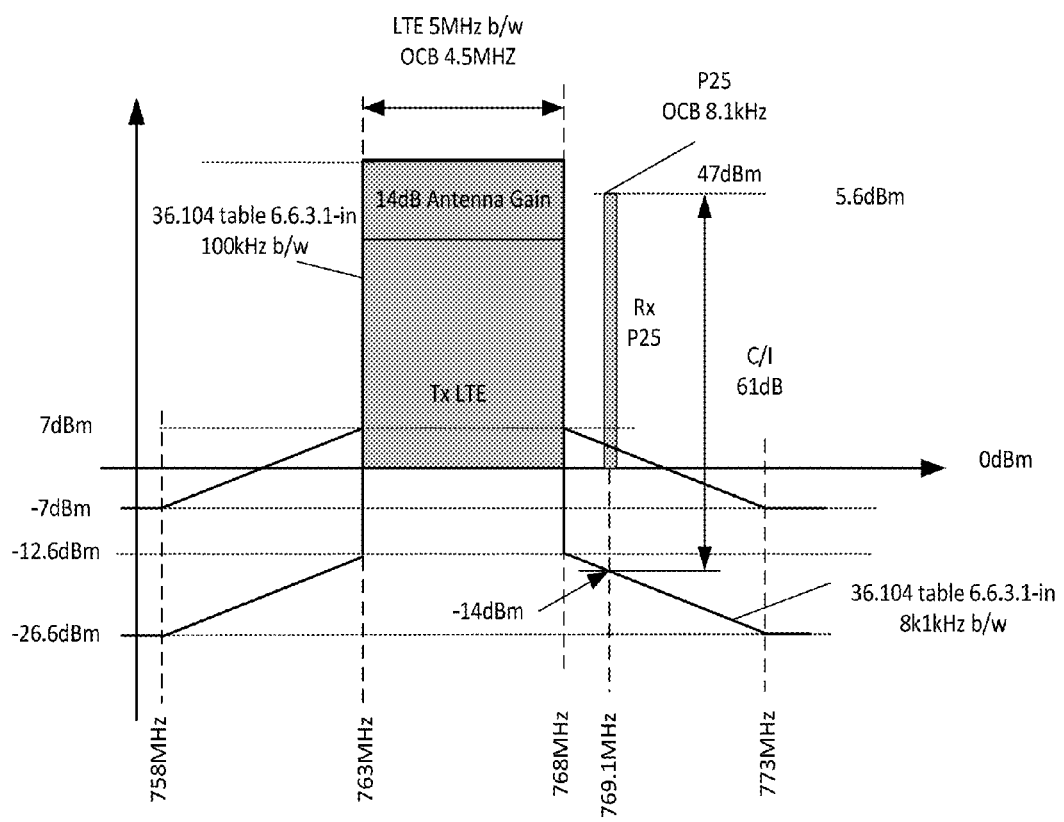
Figure 16:
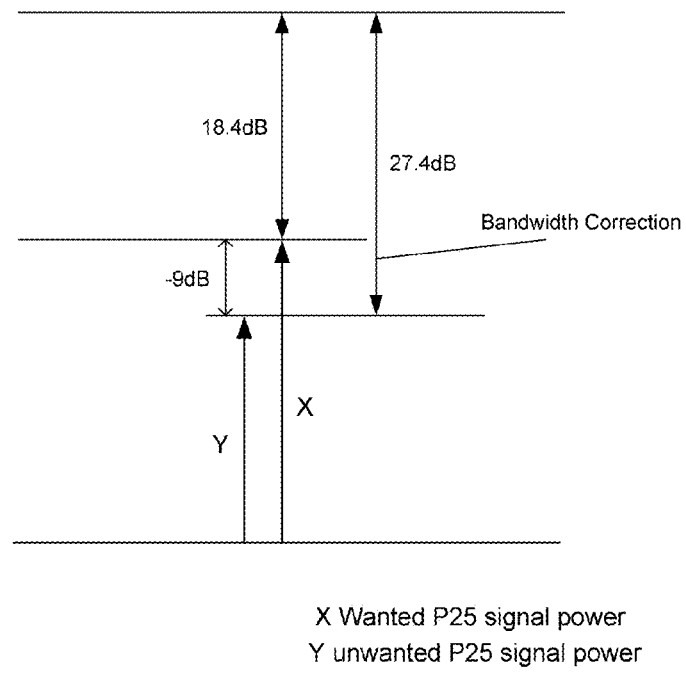
Figure 17:
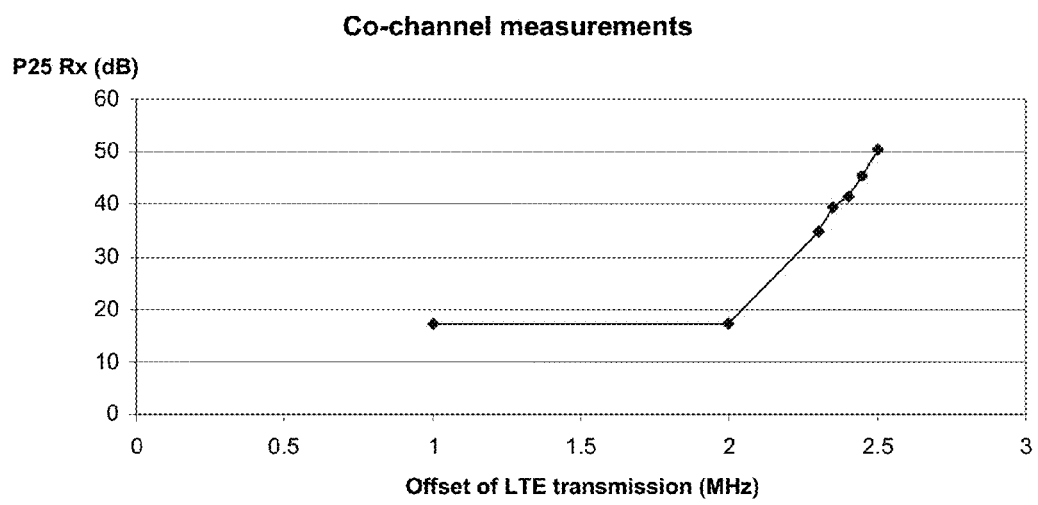

Preferred embodiments of the invention will be described with respect to the accompanying drawings, of which:

FIGS. 1A, 1B, 1C, 1D schematically show options for frequency overlays of P25 and LTE in a wireless communication system, FIG. 2 shows a simple system with P25 and LTE base stations and terminals, FIG. 3 outlines a general controller process for allocating an overlay channel, FIG. 4 outlines a process for prioritizing a critical call, FIG. 5 outlines a general process for allocating a P25 channel over LTE, FIG. 6 is a sequence diagram showing allocation of an overlay channel, FIG. 7 outlines a scheduler process for establishing LTE overlay availability, FIG. 8 illustrates a terminal process for establishing overlay channels, FIG. 9A illustrates a terminal moving through an area with multiple bearer sites, FIG. 9B illustrates a group of terminals in an area with multiple bearer sites, FIGS. 10A, 10B, 10C show example configurations of P25 overlay on LTE spectrum, FIGS. 11A, 11B show example configurations of LTE bandwidth expansion, FIGS. 12A, 12B show example configurations of LTE bands split and mixed between P25 operation, FIG. 13 shows a typical calculation for assessing wideband noise performance effects of P25 on LTE, FIG. 14 shows an adjacent channel power analysis of P25 affecting LTE, FIG. 15 shows an analysis of the impact of LTE emissions on P25 reception, FIG. 16 shows a co-channel analysis of the impact of LTE on P25, and FIG. 17 shows sample measurements of co-channel analysis of the impact of LTE on P25.

DESCRIPTION OF PREFERRED EMBODIMENTS

Referring to the drawings it will be appreciated the invention may be performed in a variety of ways using LTE and P25, and possibly a range of other communication bearers such as the DMR or LMR. Conventional details of these bearer systems need not be given in detail for a skilled reader. It will also be appreciated that the embodiments described here, using FDD 5 MHz and 10 MHz, are given by way of example only.

FIG. 1 shows how one or more P25 channels can operate within the same frequency band as LTE, thus enabling efficient frequency use of the assigned spectrum. These modes are made possible through collaboration between LTE and P25 base stations, or collaboration between LTE and P25 terminals. This collaboration can be either automatic or preconfigured. Four modes of operation are:

1A. P25 operating in a space created through reducing the bandwidth occupancy of LTE.
1B. P25 operating in a push through mode using a transmission power which is higher than relatively low powered LTE transmissions.
1C. P25 operating in the skirts of LTE transmissions.
1D. P25 operating within a disabled resource block of LTE.

In FIG. 1A, a P25 transmission occurs in a space vacated by current LTE activity. One example of this mode would be a contraction of LTE activity from 5 MHz bandwidth down to another standard configuration such as 3 MHz or even 1.4 MHz. The converse also applies and in the absence of P25 activity an LTE transmission can expand to occupy greater bandwidth.

In FIG. 1B, a P25 transmission over rides current LTE activity. The P25 narrow band transmission dominates the relatively low energy level used by LTE in a particular resource block, as present at a receiving station such as a base station or a terminal. This push through mode may only be suitable for emergency mode or other critical communications. It will create interference for LTE signals in the resource block, possibly in just one sub-channel. In practice, LTE data is spread across many resource blocks with varying degrees of protection.

In FIG. 1C, a P25 transmission can take place in the skirts of an LTE band, or more generally, in the outer edge of an outer resource block. In this case, the P25 transmission creates little or no interference for LTE signals, as P25 signals generate minimal ACP (adjacent channel power). Conversely, LTE creates only a low level of interference for P25 signals as the power spectral density in that channel is low.

In FIG. 1D, a specific LTE resource block is either temporarily or permanently configured for P25. In this mode, a P25 transmission having a width of about 12.5 kHz may occur within a range of 180 kHz provided by the LTE block, and may cause low level interference with LTE, because LTE downlink transmissions may continue to send control information in each timeslot. An LTE transmission may also include reference signals. A narrow band P25 transmission may therefore interfere with one or two sub-channels. However, the signalling is spread across a relatively wide frequency so this interference is expected to be minimal.

FIG. 2 shows an example site in a radio network having an LTE base station 20 and one or more P25 base stations 21, with a common controller 27, typically a scheduler, and each with respective data streams. The base stations may be provided together at a single site or at separated sites, and are typically locked together by a frequency reference 22 such as GPS. The LTE and P25 parts of the network generally have separate schedulers or may have a joint scheduler. A unit 23 having an LTE terminal 24 and a P25 terminal 25 are linked by a controller 26. The unit 23 can be manufactured by simply linking two existing LTE and P25 terminals using an existing device such as a laptop, or by providing an integrated dual mode device. In the case of an existing device, a dedicated hub may also be provided, as an interface between a laptop and the two terminals for example. The LTE base station 20 communicates with LTE terminal 24 according to the resources assigned to that terminal, such as full assignment or resource blocks 1 to 25 including all message timeslots. The P25 base station communicates with P25 terminal 25 on an assigned frequency pair which overlays the LTE spectrum, but would conventionally be spectrally distant from LTE transmissions. The controllers 26, 27 each include a processor, memory and conventional network hardware. The memory contains software instructions which cause the respective base stations and terminals to carry out overlay processes as described below.

FIG. 3 shows a flow chart for a process by which controller 26 or 27 in FIG. 2 establishes a P25 connection in the presence of LTE transmissions. The process is initially waiting for a P25 connection request to be made. If a P25 connection is requested 30 then an assessment 31 is undertaken to decide if there are any LTE resource blocks (frequency slots) available. This information is available by interrogation the LTE scheduler which can report the availability 32 of either resource blocks or the current bandwidth of operation. Availability of resources may be achieved either through a change of LTE transmission bandwidth (e.g.

from 10 MHz to 5 MHz), through the use of one or more unallocated resource blocks, or through the use of the guard band for example. If spectrum is available 33 then a P25 connection can be established 35 according to policies of the overall system. If no resource blocks are available then push through operation may be used if permitted 34. If this mode is not possible then P25 access will be denied 36.

FIG. 4 shows an approach which offers preferential allocation of P25 channels in the event of the request being made for a critical voice connection, such as an emergency call. Although mission critical voice is selected by way of example, the same approach can apply to other critical information such as location data. A mission critical call is requested 40. The current status of resource blocks is assessed 41 and a sequence of decisions is made as follows. If standard P25 channels are available 42 then a standard P25 connection is established 43. Alternatively, if unused resource blocks (including guard bands) are available 44 then a P25 overlay channel is assigned 45, as opposed to establishing a call using VOIP technology over broadband. If none of the above options exist 46 then a P25 call may be established over an existing allocated channel 47. Such a scenario would normally only be used for emergency calls. If all the above conditions are unsuitable, generally due to lack of P25 coverage then a VOIP call could be established over broadband 48.

A P25 trunked controller may have a channel list with channels which are either standard P25 channels or overlay channels which exist somewhere in an LTE bandwidth allocation. A request for a channel may be received on a trunked control channel. If standard P25 channels are available, such as those available within the US narrowband allocation of 769 to 775 paired with 799 to 805 MHz, then the request may be assigned to a standard P25 channel. If no standard P25 channels are available or operating according to the local system policy then an alternative is to allocate P25 channels which spectrally exist within the LTE spectrum allocation, such as portions of available spectrum within the US broadband band allocation of 758 to 768 paired with 788 to 798 MHz. This assignment of frequency location can be made through interrogating a database of either instantaneous or preconfigured system usage.

FIG. 5 provides an example in which the standard P25 channels are all assigned. Channel assignments are maintained in a database which is typically held in the P25 controller or a joint P25/LTE system scheduler. An LTE system with m frequency blocks that is currently operating in the same area is only using 5 MHz bandwidth. The trunked controller can therefore assign P25 channels in the currently unused LTE spectrum shown in this example as between frequency blocks 26 and m−1. It is preferable to avoid use of block 26 in this case but rather leave a guard band which may represent 5 frequency blocks, for example. The trunked controller would therefore preferentially assign P25 channels to operate in frequency blocks 31 and above. This would reduce interference.

The policy described so far involves assigning P25 channels to frequency locations in which minimal interference is created. An alternative policy may allow the P25 channel to be assigned either within the guard band of an active LTE transmission or within a currently unused resource block. If block 14 in FIG. 5 currently had no user data active then a P25 channel could be assigned there at the cost of some interference, for example. Alternatively a P25 channel could be assigned at any position over the LTE bandwidth based upon a push through mode of operation, typically only in an emergency situation.

A policy of allocation within unused LTE spectrum is preferable as it creates minimal interference issues. Operating in the skirts of the LTE transmission is the next most favourable approach and it is estimated that around 300 to 400 kHz beyond the outer resource block enables operation with minimal interference between bearers. If neither standard P25 channel nor vacant LTE spectrum nor guard band are available then allocation may take place on an active LTE resource block but where this resource block is not carrying any user data. Generally, within an LTE resource block which is unused, the reference signals and control information within the frame should be turned off to minimise interference to the P25 receiver. The use of this resource block should then become restricted for the length of the P25 call. Because P25 channels are 12.5 kHz wide, multiple channels could fit within the 180 kHz bandwidth of an unused LTE resource block. Alternatively, a set of resource blocks may be unused and therefore P25 channels could be established in more than one position.

If no resource blocks are available within a reasonable time then a second assessment is made. If the option of P25 push through is enabled the P25 transmission may take place anyway over the top of the LTE transmission. This option may be enabled in the case of an emergency connection where connectivity via P25 overrides the importance of any data that may be on the current resource block. These modes can be applied for both downlink and uplink. If neither a resource block nor the option of transmitting in the skirts and the push through configuration is disabled then P25 access is denied.

The use of multiple possible P25 channels can be enabled through "scanning" which is a conventional technique. A P25 radio can either be tuned to a fixed frequency or can be configured to scan/vote to periodically look for activity across a range of frequencies. If relevant activity is detected the radio locks onto the particular channel reception.

Because P25 channels are 12.5 kHz wide, multiple channels can fit within the 180 kHz bandwidth of an unused LTE resource block. Alternatively, a set of resource blocks may be unused and therefore P25 channels could be established in more than one position. When resource blocks at one edge LTE transmission are shut down this is the equivalent to changing LTE operating between standard operating bandwidths, such as from 10 MHz to 5 MHz.

FIG. 6 provides a sequence diagram relating to the example of a P25 controller. A terminal asks for a connection and is allocated an LTE overlay channel. A connection request is made to the trunked controller which reviews the channel status. In this case, all standard channels are busy but overlay channels are available. In this case because the channels are within the LTE spectrum allocation but which are not currently in use. The controller now reviews current system policies. The policies are those generally used in a trunked P25 system and in this case, it is assumed that unoccupied LTE spectrum can be used for P25, but that the skirts, guard band, push through mode and operational resource blocks cannot be used. Some of the LTE spectrum is unused. As a result, the P25 channel is allocated in the used LTE spectrum and the database updated.

This represents an approach of dynamically expanding the mission critical P25 operation or the broadband operations according to which mode is required at the time. In this example we assume all standard P25 channels are busy and the only channel available is the overlay channel which is established through interrogating a commonly accessible database. The resource block available is one nominally assigned for LTE use but which is currently inactive due to the LTE bandwidth in that area being 5 MHz instead of 10 MHz at that time. Hence a P25 channel is assigned to the overlay position for the duration of the call. The database is also updated so that the broadband scheduler is informed to block access or reduce its bandwidth operation on this portion of the resource and the trunking controller is informed of success. It then sends the user to that channel.

FIG. 7 shows a complementary version of the process in FIG. 6. Here, the broadband system, which is typically an LTE scheduler, is waiting for LTE connection requests.

Upon receiving a data connection request the scheduler may choose to allocate a user to a standard broadband position, such as portions of available spectrum within the US assigned broadband band allocation of 758 to 768 paired with 788 to 798 MHz. If however the P25 allocations in that area are not being used, as established through interrogating a database of usage, then the broadband system may expand its bandwidth of operation to extend across parts of the nominal narrow band allocation, for example 769 to 775 MHz paired with 799 to 805 MHz.

An equivalent process exists on the uplink where a multi-bearer device is in use. A controller is illustrated as the terminal end in FIG. 2 and typically represents a physical processor which is connected to multiple bearers. One of the main functions of this processor is to make decisions about which bearer to use on the uplink of a multi-bearer communication. For example, preferential selection of uplink bearers may be made based upon availability of a bearer or upon the system policy. The policy may be to always use P25 for critical voice communications and only to use a broadband connection for voice if P25 is not available. In the system described here, the purpose of the decision making process is rather to find available channels and if necessary adopt an overlay channel approach.

FIG. 8 illustrates a terminal process for selecting which bearer to use. This process resides on the controller in FIG. 2 and interrogates both the P25 terminal and the broadband terminal to establish current availability of channels, bandwidth of operation or current usage levels of resource blocks. The information is available at a typical LTE terminal device because the device is able to detect the current bandwidth of operation and the current allocations of uplink resource. In this particular example the table illustrates how there are many P25 channels which are all in use. In this case, either guard band, unused LTE bandwidth or even inactive resource blocks may be used for establishing a mission critical call. If the LTE device is out of range of an LTE transmission then a policy may be adopted such that the terminal may or may not transmit P25 within known LTE allocations of spectrum. This minimises the chance of interference. An alternative policy may require that a P25 transmission not take place if the LTE signal strength or signal quality is above a predefined level. This policy may be applied to prevent the P25 transmission located physically close to an LTE receiver from causing significant interference through wideband noise emissions. An alternative policy may be to limit the power of the P25 transmission depending upon the LTE signal strength being observed.

FIG. 9A shows a simple system where a multi-bearer unit 90 is moving through a geographic area which is served by multiple bearers. Base sites 91, 94 provide coverage for P25 only, on channels fn at bandwidth B 1. Base site 92 provides coverage for LTE only, on channel f3. Site 93 provides both P25 and LTE. Their coverage overlaps in part but is not available continuously over the entire area. A network operation centre 95 exercises control over the network formed by these sites and includes a scheduler. In this example, the allocation of P25 channels is nominally for critical voice activity. Initially the unit 90 can only connect with site 91 using P25. Moving northeast the unit passes through a region where LTE is provided by site 93 but is only operational within a 5 MHz bandwidth. While still being served by site 91, the unit continues to operate on a standard P25 channel. If no standard P25 channels are initially available via site 94, the unit may be allocated to an overlay position somewhere within the currently unused 5 MHz bandwidth of the LTE coverage. A system of this kind must comply with proper RF design techniques to avoid co-channel, adjacent channel or blocking probabilities.

FIG. 9B shows another simple system where a group of radios is located in the same geographic area as the system in FIG. 9A. Subset A of the radios is served by base sites 91 and 93 and can communicate using either P25 or LTE. Subset B of the radios is served only by 91 and can communicate using P25. Subset C is served only by base site 93. Each subset could represent multiple radios or could be a single radio. The network operation centre 95 determines that subset A has access to both P25 and LTE, that subset B only has access to P25, and that subset C only has access to LTE. Channel resources are allocated accordingly when a group call is set up. For example, subset A may be allocated a broadband channel using LTE rather than P25 while subset B will be allocated a trunked radio channel using P25. As the radios move around the geographic area resources can be re-allocated according to the availability of channels at each site.

FIG. 10 shows spectrally an example where the LTE operation is scaled down from one side or another to accommodate a demand for P25 channels. FIG. 10A shows the standard configuration for radio system operation in the US with broadband LTE operational in a nominal bandwidth of 10 MHz from 758 to 768 MHz, and narrow band LMR operation in a block of spectrum between 769 to 775 MHz. FIG. 10B shows an example where the LTE bandwidth reduces from a nominal 10 MHz to 5 MHz opening temporary space for mission critical P25 operation in the lower 5 MHz portion. FIG. 10C shows an example where the LTE bandwidth is reduced to 3 MHz allowing temporary P25 operation either side of LTE. It should be noted, for convenience, here we illustrate the downlink segment of operation whereas the apparatus described here applies equally to the uplink.

FIG. 11 shows a complementary example where P25 operation in a nominal allocation of 769 to 775 MHz is reduced. In this case, the demand for broadband data operation exceeds the requirement for mission critical voice in narrow band channels. As a result, the system has extended the broadband operation across 15 MHz and LMR operation is limited to a small bandwidth which in this example exists between 774 and 775 MHz. It is prudent to maintain a guard band.

FIG. 12 shows another example. In this case, broadband operation extends across 10 MHz but through aggregation of different positions within the spectrum range. The positioning of LMR is also split across the band to produce an aggregate of 6 MHz for example.

An analysis of the interference effects between P25 and LTE for sample overlay configurations of P25 and LTE can be provided. The analysis focuses upon the downlink. Generally there are three key forms of interference, co-channel (on channel), adjacent channel interference and wideband noise.

FIG. 13 shows a system example where P25 is operating with the LTE spectrum allocation but where the bandwidth of LTE operation has been reduced such that LTE and P25 do not overlap. In this case there is no on-channel interference caused by P25 on P25 nor by LTE on P25.

FIG. 14 offers an analysis of wideband noise based on TIA performance figures assuming the interferer is off channel. This example shows a P25 transmission occurring at 50 W (47 dBm) within an 8.1 kHz bandwidth and an LTE transmission occurring with a total power of 54 dBm across the total occupied bandwidth of 4.5 MHz. An example transmitter power for LTE is 40 dBm but it is also typical to use a directional antenna and a 14 dB gain has been selected. With reference to FIG. 14, consider the effect of P25 transmissions on the LTE receiver. TIA 102.CAAB defines the emission mask at 80 dBc in a 30 kHz b/w between 400 kHz and 12 MHz away from carrier. This extends across the LTE Rx allocation. To estimate the total energy entering the LTE Rx band, we need to accumulate the P25 energy over the entire 4.5 MHz band. This yields a figure of 58.3 dB down from the P25 carrier power. Given this ratio, it means an absolute power of −11.3 dBm will be seen in the LTE terminal Rx from the P25 wide band emissions. This means that for a co-located LTE and P25 site the LTE terminal receiver will experience a C/I of 65.3 dB. The C/I required for a good data rate in LTE is around 19 dB hence the LTE performance will be fine and P25 will not significantly interfere with LTE. If the LTE base station and P25 base station are located separately then it is possible for an LTE terminal receiver to experience interference due to wideband noise from a P25 transmitter if said transmitter is only capable of meeting the TIA defined specification.

Considering an uplink case, given the US allocations and the standard P25 specifications, then on the uplink a P25 terminal could cause an interference problem over the adjacent LTE uplink (just 1 MHz away) if the P25 terminal was close to the LTE uplink antenna and the LTE terminal were far away. The LTE terminal will be operating power control anyway and its modulation and coding rate changes according to the observed interference level.

Referring to FIG. 14, we can estimate the ACPR case. TIA 102-CAAB-B section 3.2.8.2 defines the adjacent channel power ratio of the P25 transmission. Notably it defines the power ratio 37.5 kHz off frequency as 60 dB in a 25 kHz bandwidth. It is therefore possible to estimate how close a P25 transmission can operate to the edge of an LTE emission. Assuming interference from the P25 emission applies across the whole of the nearest resource block of 180 kHz. Given this, the 60 dB figure within 25 kHz becomes 51.4 dB across the 180 kHz bandwidth. In the example shown, we assume a 47 dBm P25 transmission and a total of LTE transmission power of 54 dBm (including the gain of a 14 dB direction antenna). Based on this LTE transmission power, we can estimate the power within the single resource block on the edge as being 40 dBm (i.e. 54 dB−10*log 10(1/25). Given this configuration, the C/I ratio within the resource block at the edge is approximately 44.4 dB. This suggests that P25 could operate safely at a position closer to LTE than the 1 MHz guard band currently specified. Once again however, if base stations are not co-located then a wider frequency separation would be required.

FIG. 15 analyses the case where LTE transmission may interfere with P25 reception. We simply use one of the 3GPP base station masks as an example. This mask is applied to the scenario with an antenna gain of 14 dB and shown in blue. The specification assumes a 100 kHz b/w. The energy arriving in a 8.1 kHz bandwidth must be corrected. Assuming the path loss of over the P25 channel and the LTE channel are the same and the terminal is not so far away as to be below the P25 sensitivity limit then the C/I seen at the P25 receiver will be 61 dB. The C/I required for >=2% BER is typically 16 dB hence LTE will not significantly affect the performance of a P25 receiver.

FIG. 1B shows an example where P25 operation occurs directly over the top of an LTE transmission. Here, we examine the impact on the P25 reception (assume a receiver noise B/w of 8.1 khz) through examining the expected co-channel performance levels.

FIG. 16 illustrates a co-channel example where X represents a wanted P25 signal at the edge of range where for example this may be −118 dBm for a 1% BER for an example radio. Typical specifications suggest that the receiver of the wanted P25 signal should be capable of maintaining the same level of BER when another P25 signal operating on the same frequency which is 9 dB weaker than the wanted. Specifically this is typically tested by increasing the wanted signal level by 3 dB, then starting from a substantially lower power P25 interferer (with a predefined transmission pattern) and gradually increasing the interfere power until such time the BER observed at the wanted received returns to a nominal value.

In this case we have chosen a nominal value of 1% which typically represents a very good voice signal. Now we consider the effect of an LTE transmission occurring over 4.5 MHz in a channel allocation of 5 MHz. Also assume the transmission is fully occupied with data (worst possible case). LTE is now an interferer over P25.

The energy from an LTE transmission spilling into the narrow band of a typical P25 receiver would be approximately 27.4 dB (10*log 10(8100/45e5) down compared to the total power of an LTE transmission. Given this and working with a co-channel requirement of 9 dB, we can estimate that an LTE transmission occurring over a P25 transmission could be 18.4 dB more powerful than P25 before causing a co-channel problem larger than P25. This means that for a co-located P25 and LTE site, as long as the P25 source is always more than 18.4 dB more powerful that LTE within the P25 bandwidth then P25 shall not observe a BER worse than 1% due to LTE interference.

Practically one would want a larger protection margin. FIG. 14 shows real measurements undertaken using the above configuration whereupon the co-channel performance observed was approximately 18 dB. In this test, the LTE interfere was incrementally moved off channel hence we see the improving level of performance as we traverse the skirts of the LTE transmission.

FIG. 1C illustrated the option of operating P25 in the skirts (or guard band) adjacent to an LTE transmission. Referring again to FIG. 16, the skirts of the LTE transmission are naturally lower power than the main bandwidth. The co-channel performance was about 18 dB. Moving off frequency shows the impact of the transmission skirts. In this particular case there is a rapid increase in the co-channel performance reaching as much as 50 dB. In other words, subject to the system design P25 could operate in the skirts of the P25 transmission as long as a guard band of at least (approx) 300 kHz is maintained though this may increase depending upon system design.

Consider the case of a P25 transmission at 47 dBm and an LTE transmission at 40 dBm. In this case the C/I seen at the P25 terminal up to 2 MHz offset from the LTE centre frequency would be approximate 47−12.6−14=20.4 dB which is close to the observed co-channel performance shown in FIG. 17. The C/I seen at the P25 terminal at 2.3 MHz off would approximate to 47−12.6+17−14=37.4 dB. The 17 dB improvement is derived from FIG. 16 which suggests that as long as the station operates>300 kHz off the wanted channel then P25 receiver performance is acceptable. The C/I improves beyond this point.

FIG. 1D illustrated the option of operating P25 within an unused resource block within LTE. Consider the case where a P25 transmission is operating over an active LTE transmission i.e. push through. This mode of operation is not recommended but it is worth analysing. A typical transmission powers: a) The P25 transmission at 50 W (47 dBm) and this occurs with a bandwidth of 8.1 kHz. b) The LTE transmission is 10 W (40 dBm) and this occurs in a bandwidth of 4.5 MHz. The +40 dBm LTE transmission will offer just 40 dBm-27.4 dBm into the wanted P25 channel. i.e. +12.6 dBm. This means the C/I interference ratio seen at the P25 receiver is 47−12.6 dB=+34.4 dB. If we add an assumption of a 14 dB directional antenna then this means the C/I ratio seen at the P25 receiver is 47−12.6−14=20.4 dB. This figure is only just acceptable for good operation.

An individual LTE user can be allocated transmission resources within one or more resource blocks, time slotted within each resource block. Through disabling one or more RB within the LTE transmission allows the possibility of deploying P25 in this unused space. Measurements of a sample LTE system on the downlink in which one LTE resource block is no allocated to a user suggests that an unused resource block may be 10 dB down in is power compared to an fully used resource block. One might expect the power drop to be more substantial but it is important to remember that even in unused resource blocks, signalling and reference signals can still be present. The reference signals and control signals ideally need to be shut down to provide best performance on the P25 downlink. This means that P25 operating in an unused resource block would observe approximately a 30.4 dB C/I which is a good performance figure.

The invention claimed is:

1. A method of data communication, comprising:
receiving data associated with a radio moving on a path, wherein a first part of the path of the radio is located within a first region and a second part of the path of the radio is located within a second region;
determining, at a network operation centre, that the first part of the path of the radio has access to resources assigned to a trunked radio system;
determining that the second part of the path of the radio has access to resources assigned to the trunked radio system and resources assigned to a broadband data system; and
allocating resources in the first region using resources assigned to the trunked radio system and in the second region using resources assigned to the broadband data system, and
providing data to the radio on the first part of the path by the trunked radio system resources and not the broadband data system resources and on the second part of the path by the broadband data system resources and not the trunked radio system resources.

2. A method according to claim 1 further comprising:
receiving data associated with the radio moving on a third part of the path located within a third region;
determining that the third part of the path of the radio has access to resources assigned to the broadband data system and not the trunked radio system;
allocating resources in the third region using resources assigned to the broadband data system; and
providing data to the radio on the third part of the path by the broadband data system.

3. A method according to claim 1 wherein the resources assigned to the trunked radio system include frequencies 769-775 MHz and 799-805 MHz.

4. A method according to claim 1 wherein the resources assigned to the broadband data system include frequencies 758-768 MHz and 788-798 MHz.

5. A method according to claim 1 wherein the resources allocated in the first region are used for a trunked radio channel.

6. A method according to claim 1 wherein the resources allocated in the second region are used for a trunked radio channel.

7. A method according to claim 1 wherein the resources allocated in the second region are used for a broadband data channel.

8. A data communication system comprising:
a trunked radio system and a broadband data system, a network operation centre coupled to the trunked radio system and the broadband data system,
the network operation centre including a processor and a memory,
the memory including software instructions which are used by the processor for:
receiving data associated with a radio moving on a path, wherein a first part of the path of the radio is located within a first region and a second part of the path of the radio is located within a second region;
determining that the first part of the path of the radio has access to resources assigned to a trunked radio system;
determining that the second part of the path of the radio has access to resources assigned to the trunked radio system and resources assigned to a broadband data system; and
allocating resources in the first region using resources assigned to the trunked radio system and in the second region using resources assigned to the broadband data system, and
providing the data to the radio on the first part of the path by the trunked radio system resources and not the broadband data system resources and on the second part of the path by the broadband data system resources and not the trunked radio system resources.

9. A method according to claim 8 wherein the resources allocated in the first region are used for a trunked radio channel.

10. A method according to claim 1 wherein the resources allocated in the second region are used for a trunked radio channel.

11. A method according to claim 1 wherein the resources allocated in the second region are used for a broadband data channel.

12. A method of data communication, comprising:
receiving data associated with a group of radios, wherein a first subset of the group of radios is located within a first region and a second subset of the group of radios is located within a second region;
determining, at a network operation centre, that the first subset of radios has access to resources assigned to a broadband data system and resources assigned to a trunked radio system;
determining that radios included in the second subset of radios do not have access to resources assigned to the broadband data system; and
allocating resources in the first region using resources assigned to the broadband data system and in the second region using resources assigned to the trunked radio system, and subsequently providing data to the first subset of radios by the broadband data system resources and not the trunked radio system resources and to the second subset of radios by the trunked radio system resources and not the broadband data system resources.

13. A method according to claim 12 wherein a third subset of the radios is located within a third region, further comprising:
  determining that radios included in the third subset of radios do not have access to resources assigned to the trunked radio system;
  allocating resources in the third region using resources assigned to the broadband data system; and
  providing data to the third subset of radios by the broadband data system and not the trunked radio system.

14. A method according to claim 13 wherein the resources assigned to the trunked radio system include frequencies 769-775 MHz and 799-805 MHz.

15. A method according to claim 13 wherein the resources assigned to the broadband data system include frequencies 758-768 MHz and 788-798 MHz.

16. A method according to claim 13 wherein the resources allocated in the first region are used for a trunked radio channel.

17. A method according to claim 13 wherein the resources allocated in the second region are used for a trunked radio channel.

18. A method according to claim 13 wherein the resources allocated in the second region are used for a broadband data channel.

19. A data communication system comprising:
  a trunked radio system and a broadband data system, a network operation centre coupled to the trunked radio system and the broadband data system,
  the network operation centre including a processor and a memory,
  the memory including software instructions which are used by the processor for:
  receiving data associated with a group of radios, wherein a first subset of the group of radios is located within a first region and a second subset of the group of radios is located within a second region;
  determining that the first subset of radios has access to resources assigned to a broadband data system and resources assigned to a trunked radio system;
  determining that radios included in the second subset of radios do not have access to resources assigned to the broadband data system; and
  allocating resources in the first region using resources assigned to the broadband data system and in the second region using resources assigned to the trunked radio system, and subsequently
  providing data to the first subset of radios by the broadband data system resources and not the trunked radio system resources and to the second subset of radios by the trunked radio system resources and not the broadband data system resources.

20. A method according to claim 19 wherein the resources allocated in the first region are used for a trunked radio channel.

21. A method according to claim 19 wherein the resources allocated in the second region are used for a trunked radio channel.

22. A method according to claim 19 wherein the resources allocated in the second region are used for a broadband data channel.

* * * * *